(12) United States Patent
Longuski et al.

(10) Patent No.: US 6,332,592 B1
(45) Date of Patent: Dec. 25, 2001

(54) METHOD FOR VELOCITY PRECISION POINTING IN SPIN-STABILIZED SPACECRAFT OR ROCKETS

(75) Inventors: James M. Longuski, Lafayette; Daniel Javorsek, II, West Lafayette, both of IN (US)

(73) Assignees: Donald E. Townsend; Donald E. Townsend, Jr., both of Silver Springs, MD (US)

( * ) Notice: Subject to any disclaimer, the term of this patent is extended or adjusted under 35 U.S.C. 154(b) by 0 days.

(21) Appl. No.: 09/635,225

(22) Filed: Aug. 9, 2000

Related U.S. Application Data

(60) Provisional application No. 60/147,842, filed on Aug. 9, 1999.

(51) Int. Cl.[7] .................................................. F02K 9/72
(52) U.S. Cl. ...................... 244/172; 244/3.23; 244/164; 102/374
(58) Field of Search .................. 244/3.23, 3.22, 244/73 B, 73 C, 158 R, 169, 172, 164, 170, 3.1; 102/374, 489, 393

(56) References Cited

U.S. PATENT DOCUMENTS

| | | | |
|---|---|---|---|
| 4,386,750 | * 6/1983 | Hoffman | 244/169 |
| 4,630,790 | * 12/1986 | Williams | 244/169 |
| 5,452,869 | * 9/1995 | Basuthakur et al. | 244/164 |

* cited by examiner

Primary Examiner—Peter M. Poon
Assistant Examiner—Timothy D. Collins
(74) Attorney, Agent, or Firm—Townsend & Banta

(57) ABSTRACT

A method of velocity precision pointing of spin-stabilized spacecraft or rockets is disclosed. This method involves softening the ignition transient of the ramp up phase of thrust, which may be achieved by modification of the solid propellant, applying a coating of slow burning material upon the solid propellant varying the grain density of the solid propellant over an exposed surface area or as a function of propellant depth, where depth is defined in the direction of the burn surface area regression, pre-pressurizing the combustion chamber with a gas having a molecular mass smaller than that of the combustion products and which is unreactive with the propellant, installing one or more relief valves in the combustion chamber to regulate the pressure, forming a ring of an ablative material on the throat section of the nozzle, having a rubber fitting at a throat section of the nozzle to regulate the pressure of the combustion chamber, pulsing the engine, or using a pyrogen igniter to soften the ignition transient.

18 Claims, 7 Drawing Sheets

METHOD FOR VELOCITY PRECISION POINTING IN SPIN-STABILIZED SPACECRAFT OR ROCKETS

Priority is hereby claimed for the Provisional Application No. 60/147,842 filed on Aug. 9, 1999.

FIELD OF THE INVENTION

The present invention concerns velocity precision pointing in spin-stabilized spacecraft during thrusting maneuvers, which overcomes imperfections, such as small misalignments and offsets, in the spacecraft introduced during manufacture or operation thereof which cause velocity pointing error.

BACKGROUND OF THE INVENTION

Ideally, during an axial thrust maneuver, an axial force is applied by the thrusters through the center of the mass to propel the spacecraft in a desired direction. However, as shown in FIG. 1, when a spinning rocket performs an axial thrusting maneuver, there are always body-fixed torques due to various error sources such as thruster misalignment and center-of-mass offset. The angular momentum vector remains inertially fixed, unless acted upon by an external torque.

Because of these body-fixed torques, the angular momentum vector traces a circular path in inertial space, i.e., an internal wobble is produced in the spacecraft. This internal wobble, in turn, produces an error in the pointing of the spacecraft, known as the velocity pointing error.

In spacecraft and rocket dynamics and control, two main methods are commonly used to point the vehicle along the desired path (trajectory) and obtain stability of the vehicle, i.e., reduce pointing error. When the vehicle travels in exactly the right trajectory, there is said to be no pointing error.

One method to obtain stability and an acceptable trajectory is referred to as 3 axis stabilized control, in which the spacecraft or rocket is not spinning or is spinning at an extremely low rate. In this method, a feedback control loop is provided which, while the engine is firing, sensors detect the direction in which the vehicle is actually pointing, and compares the actual direction with the intended direction.

To correct pointing errors, small thrusters are fired or the engine is rotated on a gimbal to counteract unfavorable forces. However, to implement these methods, additional thrusters must be installed on the vehicle or a complicated gimbal mechanism must be built into the spacecraft or rocket. Either of these methods add considerable extra weight, complexity, increase the chances for malfunction and increase cost of construction, launch and operation.

In the second method, spacecraft and rockets are often spun to provide stability and obtain a correct trajectory. Most commonly, spin rates are increased to overcome the error. In a representative example, the Galileo spacecraft, before performing an axial maneuver, increased the spin of the spacecraft from 3 rpm's to 10 rpm's to provide greater stability.

However, to reduce the velocity-pointing error of spacecraft or rockets, either considerable additional fuel must be carried into space to increase the spin rate, or improvements in tolerances during the manufacture of the spacecraft engines are needed, both of which are very costly.

In another proposed method, as disclosed in the article entitled "Annihilation of Angular Momentum Bias During Thrusting and Spinning-up Maneuvers", *The Journal of the Astronautical Sciences*, vol. 37, No. 4, October–November 1989, pp. 433–450, a maneuver scheme involving two burns, with a coast or delay in between, may be used. After the first burn, when the thruster reaches the appropriate orientation, the spacecraft coasts. Then, the thruster is reignited, initiating a second burn, which causes the angular momentum vector to encircle the inertial Z axis. However, this maneuver bars the use of a solid fuel motor.

In view of the above, it is an object of the present invention to overcome the above mentioned problems/disadvantages encountered when attempting to overcome velocity pointing error in spin-stabilized vehicles, such as spacecraft or rockets, during thrusting maneuvers.

It is another object of the present invention to produce a thrust profile to minimize velocity pointing error while simultaneously driving the angular momentum of the spacecraft or rocket back to its originally desired position.

It is a further object of the present invention to eliminate the need for high spin rates, which require additional fuel for producing high spin rates and increases cost, while obtaining velocity precision pointing with a pointing error up to several magnitudes better than that of the presently used methods.

SUMMARY OF THE INVENTION

In this regard, the present inventors earnestly conducted research in order to overcome the disadvantages of the above methods of reducing velocity pointing error in spin-stabilized spacecraft, and unexpectedly discovered that by altering a spacecrafts' thrust profile, the ramp up time, i.e., the time needed to gradually increase thrust over a time period $t_r$ to rise from a low value of from 0 to 50% of maximum thrust to a high value of greater than 50% of maximum thrust, by softening the ignition transient, produces an astounding and unexpected reduction in velocity pointing error. Specifically, the ramp up time must be equal to or greater than one period of revolution of the spacecraft.

To achieve such an object, in a first embodiment of the present invention, there is disclosed a method for velocity precision pointing in spin-stabilized spacecraft or rockets during thrusting maneuvers comprising gradually increasing thrust over a time period $t_r$ to rise from a low value of from 0 to 50% of maximum thrust to a high value of greater than 50% of maximum thrust by softening the ignition transient, the time period of the rise in thrust $t_r$ being equal to or greater than at least one period of the spin rate of the spacecraft, and being calculated by the following formula (I):

$$t_r = n(2\pi/\Omega) \qquad (I)$$

wherein n, the number of revolutions of the spacecraft desired, is a number greater than or equal to 1 and less than or equal to $t_b\Omega/4\pi$, $t_b$ being the total burn time and $\Omega$, the spacecraft spin rate, is greater than 0 and less than or equal to 42 radians/second.

In another embodiment of the present invention based on the first embodiment above, in spin-stabilized spacecraft or rockets having solid rocket motors using solid propellant, softening of the ignition transient is achieved by modification of the grain geometry of the solid propellant to delay burn time so that $t_r = n(2\pi/\Omega)$.

In another embodiment of the present invention based on the first embodiment above, in spin-stabilized spacecraft or rockets having a solid rocket motor using solid propellant, softening of the ignition transient is achieved by modification of the solid propellant comprising applying a coating of slow burning material upon the solid propellant. Such slow burning material may include waxes, binders, or any material to slow the burn rate of the propellant.

In another embodiment of the present invention based on the first embodiment above, in spin-stabilized spacecraft or rockets having a solid rocket motor using solid propellant having an exposed surface area, softening of the ignition transient is achieved by varying the grain density, the density of fuel and oxidizer in a binder, of the solid propellant over an exposed surface area or as a function of propellant depth, where depth is defined in the direction of the burn surface area regression.

In another embodiment of the present invention based on the first embodiment above, in spin-stabilized spacecraft or rockets having a combustion chamber, the combustion chamber is pre-pressurized with a gas having a molecular mass smaller than that of the combustion products produced in the combustion chamber, and which is also unreactive with the propellant to be used.

In another embodiment of the present invention based on the first embodiment above, in spin-stabilized spacecraft or rockets having a combustion chamber, one or more relief valves is installed in the combustion chamber to soften the ignition transient by regulating pressure in the combustion chamber.

In another embodiment of the present invention based on the first embodiment above, in spin-stabilized spacecraft or rockets having a combustion chamber nozzle, a ring is formed on the nozzle which is made of an ablative material which ablates during combustion to soften the ignition transient by widening the nozzle opening, i.e., the nozzle throat area. As the nozzle widens, gas is allowed to escape in greater quantities, thus increasing thrust over time.

In another embodiment of the present invention based on the first embodiment above, in spin-stabilized spacecraft or rockets having a combustion chamber with a nozzle, the nozzle has a rubber fitting at a throat section thereof to regulate the pressure of the combustion chamber.

In another embodiment of the present invention based on the first embodiment above, in spin-stabilized spacecraft or rockets having a combustion chamber with a throat, an exit nozzle, and an exit area, a method is proposed based on the first embodiment of the present invention, further comprising first filling the exit nozzle with an ablative material, then forming a hole in the exit nozzle with a diameter equal to or greater than a diameter of the throat, so that as the ablative material ablates during combustion the exit area and thrust increase.

In another embodiment of the present invention based on the first embodiment above, softening of the ignition transient is achieved by pulsing the engine to produce a rise in thrust from a low value of from 0 to 50% of maximum thrust to a high value of greater than 50% of maximum thrust over said time period $t_r$. This pulsing allows a smooth transition to a high value of thrust, thus reducing velocity pointing error.

In another embodiment of the present invention based on the first embodiment above, in spin-stabilized spacecraft or rockets having a combustion chamber, the combustion chamber has a pyrogen igniter therein which softens the ignition transient. The pyrogen igniter actually produces a small thrust before the main thrust of the engine is engaged by igniting the propellant. Therefore, the ramp up time of the thrust profile of the spacecraft or rocket is lengthened or, in the alternative, is delayed to a point sufficient to reduce velocity pointing error.

In yet a further embodiment of the present invention, the object of the first embodiment of the present invention, i.e., softening of the ignition transient to reduce velocity pointing error in spin-stabilized spacecraft or rockets, is achieved by using any possible combination of the above disclosed methods. For example, modification of the grain geometry and pre-pressurization of the combustion chamber may both be employed to achieve the desired objective.

DETAILED DESCRIPTION OF THE INVENTION

The present invention involves various methods for velocity precision pointing in spin-stabilized spacecraft or rockets during thrusting maneuvers, collectively referred to as Velocity Precision-Pointing Enhancement System (VPES), which has many advantages over existing space technology. VPES is a passive control system, requiring no control schemes to monitor the engine during firing, because it is known beforehand how the spacecraft will behave when introduced to body fixed torques. When implemented, the present method may provide a velocity pointing error 73 times smaller than that of conventional methods, which correlates to a need for a spin rate only 11.8% that of the spin rate needed presently with existing technology.

To implement these methods, it is an objective of the present invention to soften the ignition transient of the ramp up phase of the thrust transition instead of more quickly jumping up to the desired thrust. For example, conventionally, the ramp-up phase is 5–150 milliseconds, whereas the ramp up phase of the present invention is usually in the range of from 1–12 seconds.

However, the present invention does not require a lengthy ramp up time period, nor does that the ramp up period have to terminate at the thrust maximum, but may terminate at some local maximum, which could be as low as 50% of the absolute maximum thrust.

As discussed in the article authored by the present inventors entitled "Velocity Pointing Errors Associated With Spinning Thrusting Spacecraft", *Journal of Spacecraft and Rockets*, Vol. 37, No. 3, May–June 2000, which is incorporated herein by reference, after studying the angular momentum vector behavior, a thrust profile was unexpectedly discovered by the present inventors which minimizes the angular momentum pointing error.

Figure 1:
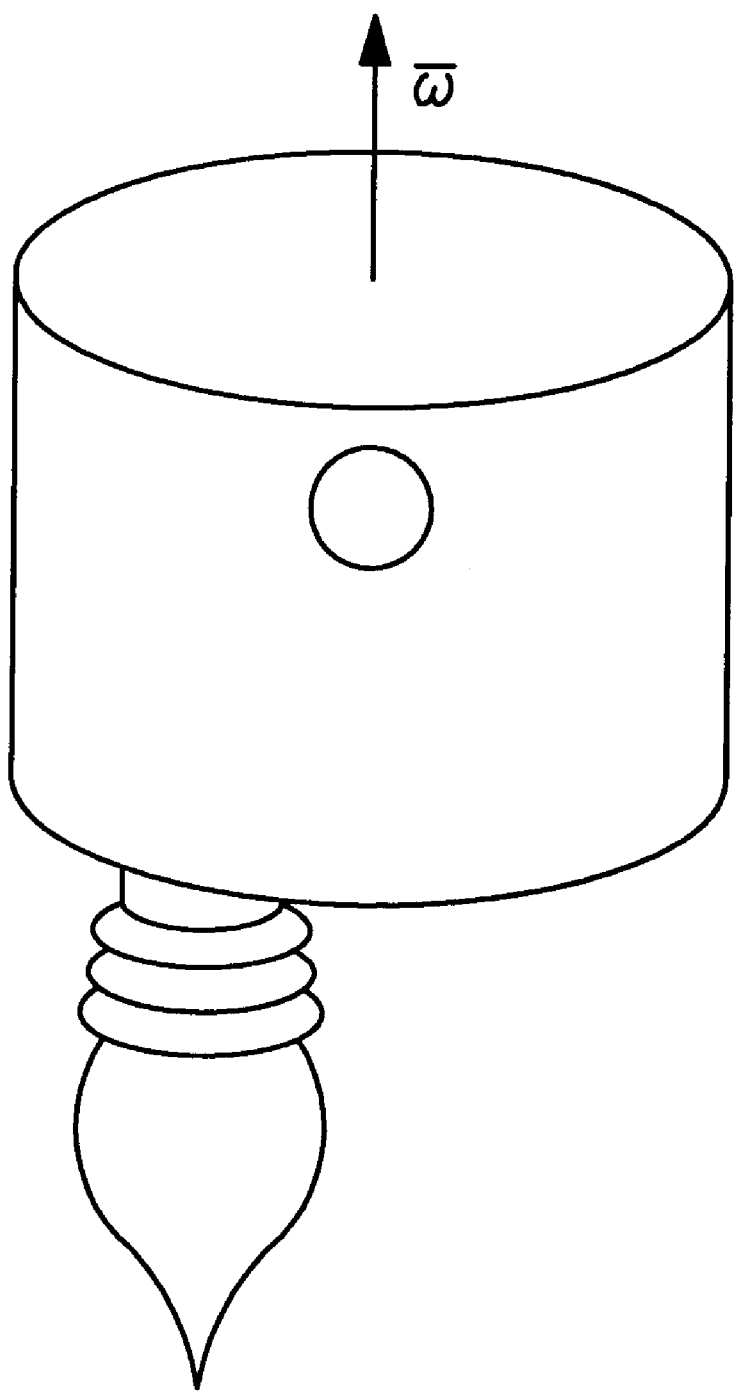
FIG. 1 depicts the thrusting problem in spacecrafts or rockets.
Figure 2:
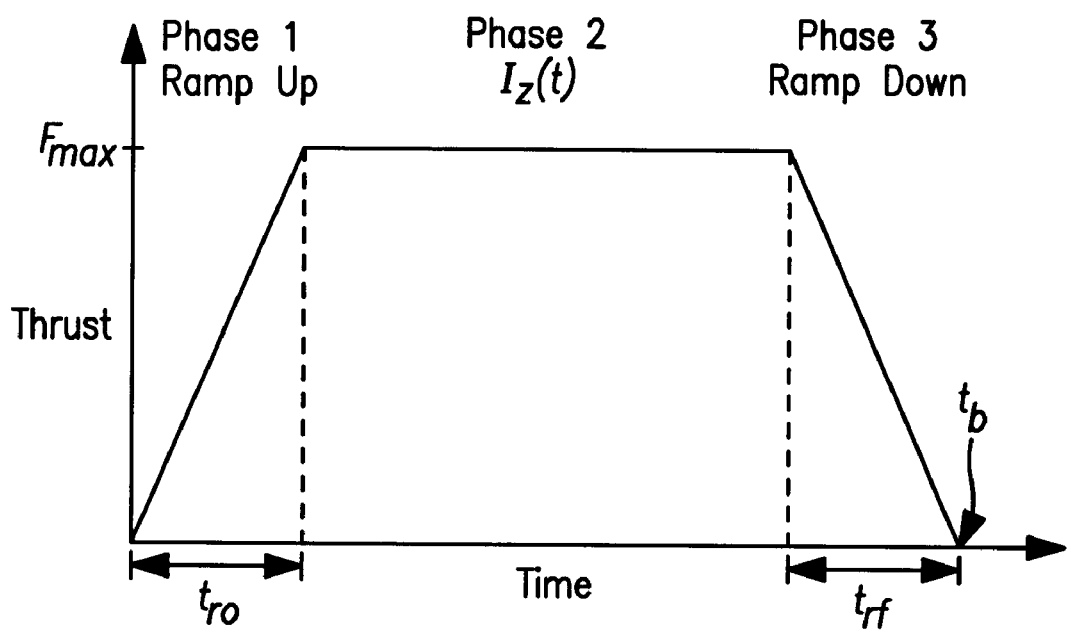
FIG. 2 is a sample thrust profile of a spacecraft or rocket using a trapezoidal thrust scheme.
Figure 3:
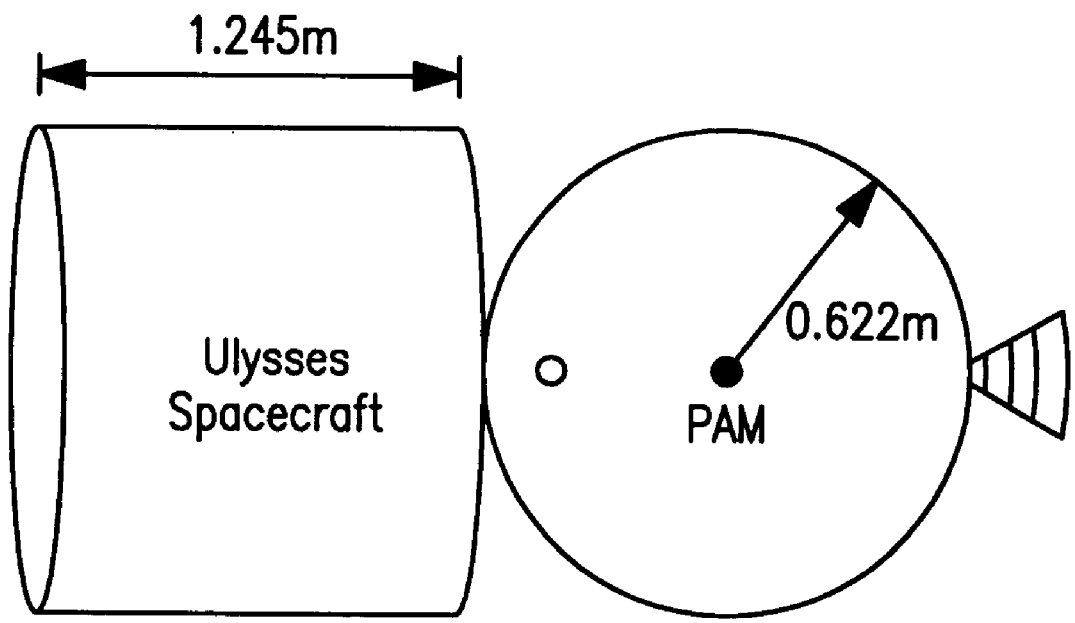
FIG. 3 shows a representative example of the Ulysses spacecraft using the Payload Assist Module (PAM).

In a trapezoidal-type thrust profile, as shown in FIG. 2, it was discovered that maintaining a ramp up time $t_r$ according to the following formula (I) achieves the object of the present invention:

$$t_r \geq n(2\pi/\Omega) \tag{I}$$

where n is a number within the range of $1 \leq n \leq (t_b\Omega/4\pi)$, $t_b$ is the total burn time in seconds, and $\Omega$ is the spin rate of the spacecraft or rocket in radians per second.

For the ideal case when the initial and final spin rates of the spacecraft or rocket are known exactly, n=1 will permit minimized pointing errors and will result in a final angular momentum vector position coincident with the initial position. Thus, depending on the uncertainty we have in the spin rate, the value for n should be greater than 1. The sensitivity of the velocity pointing error to uncertainty in spin rate decreases as n increases.

If it is desired that the ramp up time of the thrust of the spacecraft or rocket be spread out over only one revolution of the spacecraft, a value of n=1 is selected when using formula (I). When it is desired to spread out the ramp up time over twelve revolutions of the spacecraft, a value of n=12 would be chosen.

The spin rate of the spacecraft or rocket $\Omega$ refers to the spin rate of the spacecraft or rocket at the beginning of the burn. This value is accurate when used in formula (I) because, as the actual length of the ramp time $t_r$ is quite short with respect to the total burn time $t_b$, it may be assumed that during the ramp up phase of the thrust profile, the spin rate of the spacecraft or rocket is essentially constant.

The spacecraft or rocket spin rate is usually known to about 10 milliradians/second. This rate is a function of how the spin up was performed and how precisely it was monitored. For a spacecraft spinning at 1 rpm=0.1 rad/sec, 10 millirad/sec is an uncertainty of about 10%. However, for a spacecraft spinning at 70 rpm=7.33 rad/sec, 10 millirad/sec is a small uncertainty of about 0.1%.

For spacecraft or rockets spinning in the range of spin rates this invention is primarily concerned with, the spin rate is very well known. The higher the uncertainty in the spin rate, the larger n must be to achieve significant reductions in pointing error.

Figure 4:
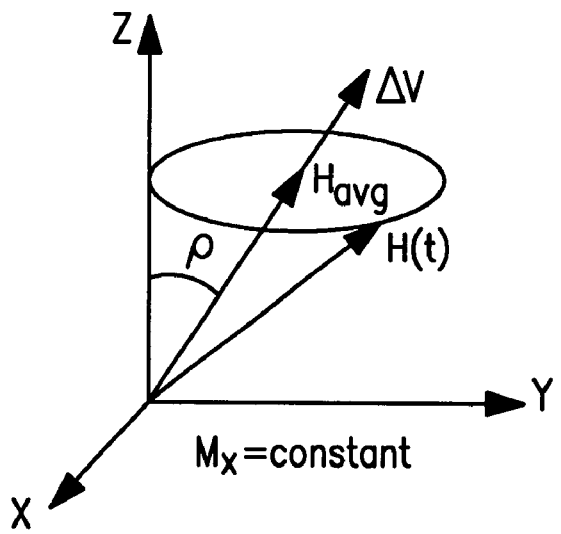
FIG. 4 is a 3 dimensional plot (xyz plot) of a spacecraft or rocket using conventional methods, showing that the average angular momentum vector $H_{avg}$ traces a small circle in inertial space, which correlates to an error in pointing or trajectory.
Figure 5:
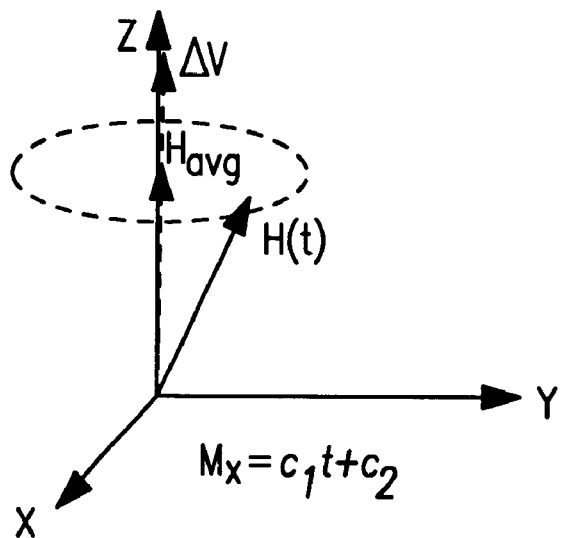
FIG. 5 is a three dimensional plot (xyz plot) of the angular momentum vector of a spacecraft or rocket using the method of the present invention, wherein the average angular momentum vector $H_{avg}$ along the Z axis or center of the circle is in an essentially straight line along the path desired.

The trapezoidal thrust scheme maintains that average angular momentum vector along the Z axis. In a spacecraft or rocket using conventional methods, it can be seen, as shown in FIG. 4, that the average angular momentum vector $H_{avg}$ traces a small circle in inertial space, which correlates to an error in pointing or trajectory. However, use of the present method maintains the average angular momentum vector $H_{avg}$ along the Z axis or center of the circle, as shown in FIG. 5, i.e., the spacecraft or rocket travels in an essentially straight line along the path desired.

The present method may also be applied to existing technology, i.e., current spacecraft, rockets or boosters may be retrofitted to achieve the above objects, and the present method applied to low-earth, geostationary or deep space orbits and the delivery of precision military weapons. The present method may be carried out with existing technology by first determining $t_r$ of the spacecraft or rocket before application of the present method. Then, it must be determined whether the $t_r$ calculated above falls within the range of values provided by formula (I) above.

If not, the spacecraft or rocket may be modified accordingly as described in the above embodiments to enable performance of the various methods disclosed herein to obtain velocity precision pointing. These modifications may include, for example, application of ablative material in the nozzle, installation of relief valves in the combustion chamber, installation of rubber rings, modification of the grain geometry of the solid propellant used therein, coating of the solid propellant in solid rocket motors with slow burning material, or combinations of all disclosed methods, etc.

EXAMPLE I

Data was obtained for the Ulysses spacecraft, which used the Payload Assist Module (PAM), on its interplanetary trajectory to the sun, and is shown below in Table I.

TABLE I

| Property | Notation | Quantity |
| --- | --- | --- |
| Maximum Thrust Force | $F_{max}$ | 76,100N |
| Maximum CM (center of mass) offset | d | 0.02 m |
| Thrust misalignment | $\alpha$ | 0.25 deg |
| Initial distance from throat of motor nozzle to CM | $h_0$ | 0.80 m |
| Final distance from throat of nozzle to CM | $h_f$ | 1.55 m |
| Initial spin rate | $\Omega_0$ | 70 rpm |
| Initial PMOI* about x axis | $I_{x0}$ | 858 kg * m² |
| Final PMOI about x axis | $I_{xf}$ | 222 kg * m² |
| Initial PMOI about y axis | $I_{y0}$ | 858 kg * m² |
| Final PMOI about y axis | $I_{yf}$ | 222 kg * m² |
| Initial PMOI about z axis | $I_{z0}$ | 401 kg * m² |
| Final PMOI about z axis | $I_{zf}$ | 102 kg * m² |
| Mass | m | 2,500 kg |
| Mass flow rate | dm/dt | −24 kg/s |

*PMOI = Principal Moment of Inertia

Figure 6:
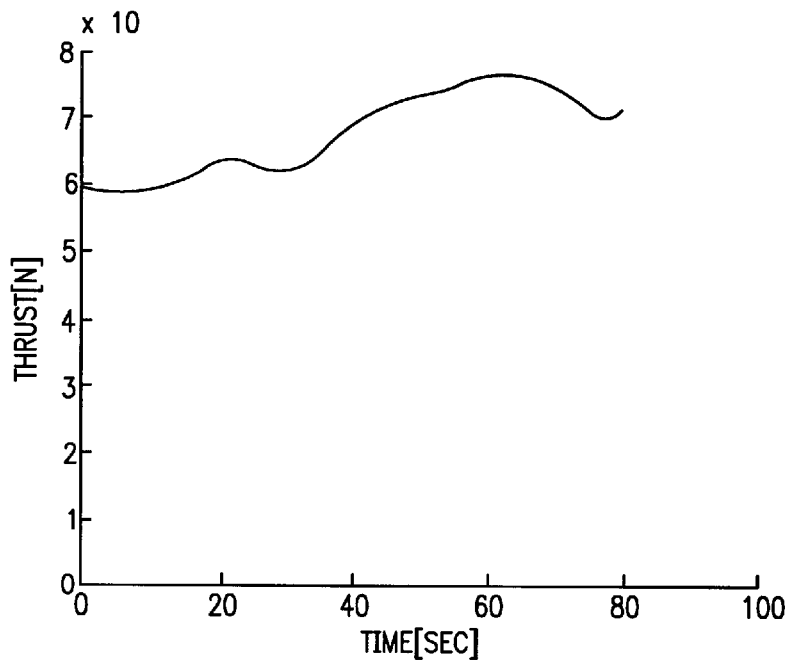
FIG. 6 is a representative thrust profile of the Payload Assist Module, Thiokol Star 48B, showing thrust (Newtons) v. time (seconds).

Using the numerical evaluation shown in "Velocity Pointing Errors Associated With Spinning Thrusting Spacecraft", a thrust profile was determined, as shown in FIG. 6 herein. With this thrust profile, the velocity pointing error was then calculated and plotted as described in the above article. This plot, shown in FIG. 7 herein, illustrates the velocity pointing error encountered when using conventional pointing methods, wherein a large deviation from the desired trajectory is encountered during the ramp up phase of the burn.

Figure 8:
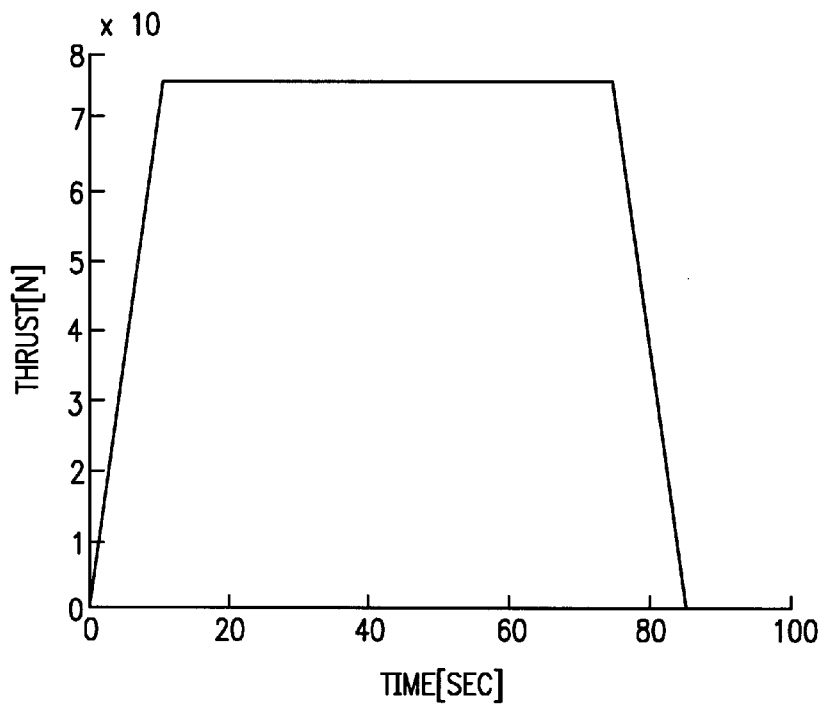
FIG. 8 is a thrust profile calculated using the numerical data contained in Table I (the same data used to plot the thrust profile in FIG. 6) when applied to the method of the present invention.
Figure 9:
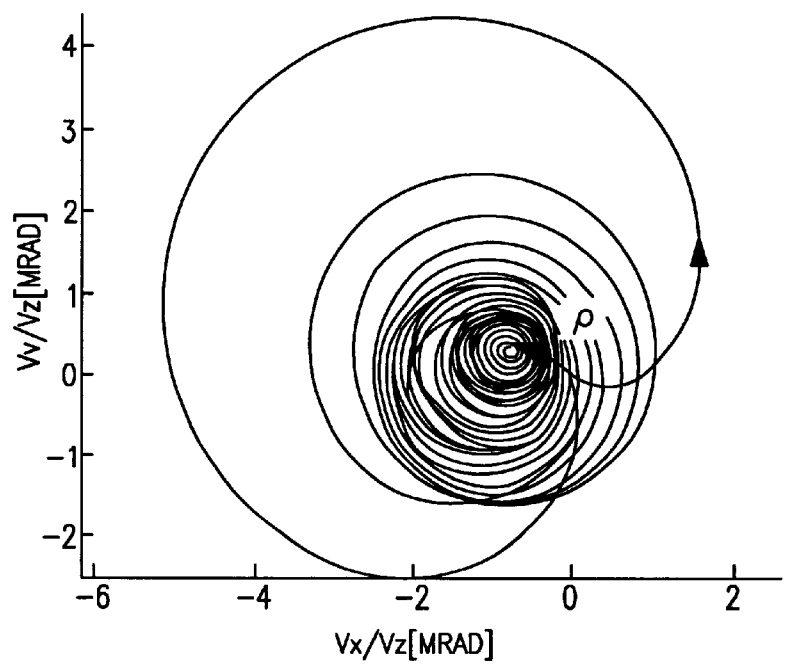
FIG. 9 is a plot of the velocity pointing error the Ulysses spacecraft would have had on Oct. 8, 1990 using the velocity precision pointing method of the present invention.

The data in Table I was then used to calculate and plot the thrust transition and velocity pointing error of the Ulysses spacecraft if the present method of velocity precision pointing had been performed according to the embodiments herein. The thrust profile of the Ulysses spacecraft using the present method is shown herein in FIG. 8, and the velocity pointing error plot is shown in FIG. 9.

Figure 7:
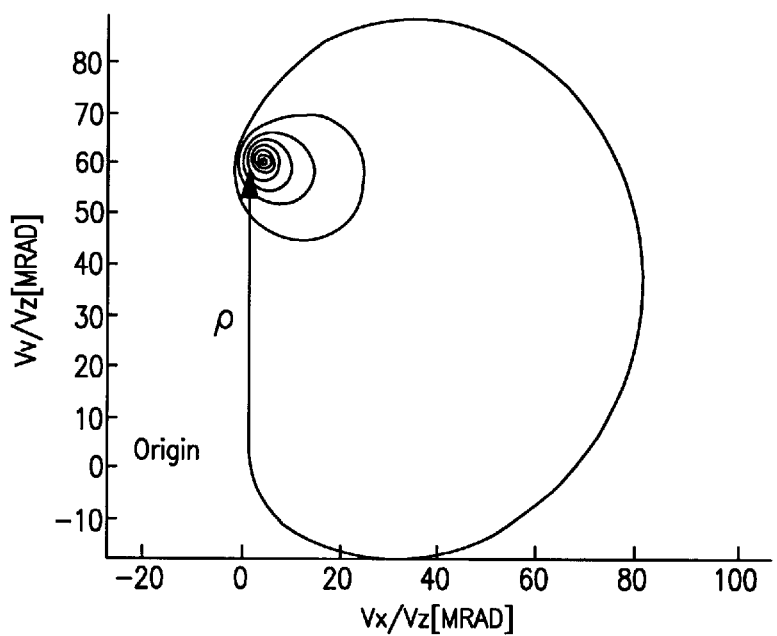
FIG. 7 is a plot which demonstrates the velocity pointing error encountered using the conventional methods, i.e., using the thrust profile in FIG. 6.

The average velocity pointing error of the Ulysses spacecraft was calculated to be 58.5 mrad, as demonstrated in FIG. 7. In contrast, as can be visualized in FIG. 9, the average velocity pointing error was calculated to be only 0.81 mrad had the present method been employed by the Ulysses spacecraft.

It should be understood that, although the ignition transient, i.e., thrust transition, appears in the Figures herein to be linear during the ramp up phase, the present method may be achieved with various other transitions, such as sinusoidal, exponential, logarithmic, etc.

The Ulysses spacecraft and rocket combination was spun up to 70 rpm's before firing the Star 48B (payload assist module) to provide a 4.2 km/s velocity increment. However, using VPES, the method of the present invention, the needed spin rate would have been only 8.2 rpm's.

Using the calculations disclosed in the academic paper entitled "Spin-Up Savings Using the Velocity Precision-pointing Enhancement System", Daniel Javorsek II and James M. Longuski, Purdue University, Jul. 31, 2000, which is incorporated herein by reference, when converting this spin rate reduction into cost savings for propellant, it can be seen in Table II below that considerable cost savings may be obtained by the present method as fuel costs are considerably reduced.

TABLE II

| Spacecraft | Spin Up $m_p$* | Savings | Despin $m_p$* | Savings | Total $m_p$* | Savings |
|---|---|---|---|---|---|---|
| ESA/NASA, Ulysses | 3.9 | $39,000 | 1.7 | $17,000 | 5.6 | $56,000 |
| LOCKHEED, AS 5000 | 13.8 | $138,000 | 8.3 | $83,000 | 22.1 | $221,000 |
| LORAL, FS-1300 | 19.9 | $199,000 | 13.6 | $136,000 | 33.5 | $335,000 |
| HUGHES, HS 601 | 19.8 | $198,000 | 13.4 | $134,000 | 33.2 | $332,000 |
| FORD, INTELSAT 5A | 11.0 | $110,000 | 5.6 | $56,000 | 16.6 | $166,00 |
| TRW, TDRS | 16.5 | $165,000 | 8.9 | $89,000 | 25.4 | $254,000 |

*mass of propellant in lbs.

To achieve the desired thrust profile, i.e., soften the ignition transient, using the first embodiment of the present invention as discussed herein, the inventors discovered various enabling methods as follows:

If solid propellant is used, modification of the grain geometry of the solid propellant to delay burn time so that $t_r = n(2\pi/\Omega)$ may be employed. This modification may include (please give us a clear explanation of the modifications (without the theory behind it), including possible preferred numerical ranges, to be inserted here). This modification may include rearranging propellant such that the surface area exposed at the beginning of the burn may be reduced to as low as the cross sectional area of the combustion chamber and such that the maximum exposed surface area is achieved at $t_r$.

In another method, a coating of slow burning material may be applied upon the solid propellant to soften the ignition transient. Any conventional slow burning material may be used, such as waxes, binders, or the like. The thickness of the coating is dependent upon the propellant used.

In another method, in spin-stabilized spacecraft or rockets having a solid rocket motor using solid propellant having an exposed surface area, softening of the ignition transient can be achieved by varying the grain density, the density of fuel and oxidizer in a binder, of the solid propellant over an exposed surface area or as a function of propellant depth, where depth is defined in the direction of the burn surface area regression. The variation is chosen according to the propellant used and the desired thrust profile.

Figure 10:
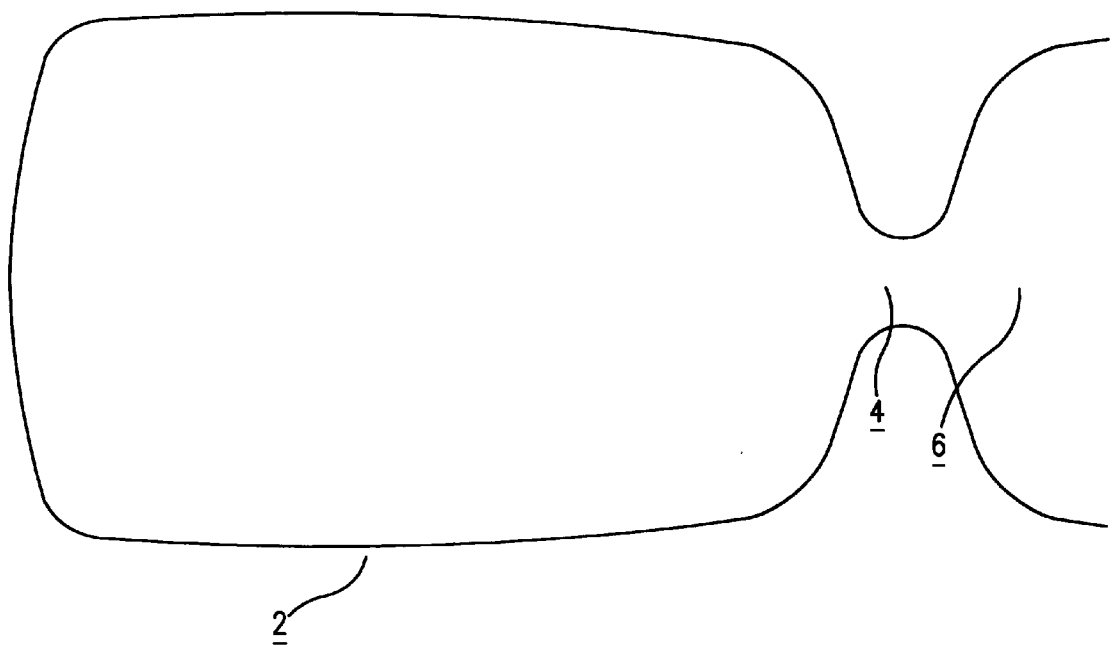
FIG. 10 is a side view cut away of a conventional combustion chamber and nozzle of a spacecraft or rocket.

In another method, in spin-stabilized spacecraft or rockets, all of which have a combustion chamber, the combustion chamber is pre-pressurized with a gas having a molecular mass smaller than that of the combustion products produced in the combustion chamber, and which is also unreactive with the propellant to be used. For example, nitrogen or an inert gas may be used. However, various gases may be used, as long as they are not reactive with the propellant used. An example of a conventional combustion chamber 2, having a throat 4 and nozzle 6 is shown in FIG. 10.

In another method, one or more relief valves are installed in the combustion chamber to soften the ignition transient by regulating pressure in the combustion chamber. The relief valves should be constructed of high temperature resistant material, and placed in an appropriate location in the combustion chamber to enable release of pressure produced by combustion.

In another method, a ring made of an ablative material is formed on the throat of the nozzle which ablates (melts away) during combustion and widens the nozzle opening. This gradual widening, which may be actually very quick, achieves a softening of the ignition transient by allowing gas to escape in a controlled manner, where thrust is increased over time.

In another method, the combustion chamber nozzle has a rubber fitting at a throat section thereof to regulate the pressure of the combustion chamber. The rubber fitting may be made of any suitable material to withstand wide temperature variations.

In another method, in a combustion chamber having a throat, an exit nozzle, and an exit area, the exit nozzle is filled with an ablative material, then a hole is formed in the exit nozzle with a diameter equal to or greater than the diameter of the throat. As the ablative material ablates during combustion, the exit area and thrust increase. This controlled increase in thrust softens the ignition transient.

In another method, the engine is pulsed to produce a rise in thrust from a low value of from 0 to 50% of maximum thrust to a high value of greater than 50% of maximum thrust over said time period $t_r$. This pulsing allows a smooth transition to a high value of thrust, thus reducing velocity pointing error. Generally, this method is used in a liquid or hybrid engine. However, any engine capable of being pulsed may employ this method.

In another method, the combustion chamber contains a pyrogen igniter therein. The pyrogen igniter itself produces a small thrust before the main thrust of the engine is produced by igniting the propellant. Therefore, the ramp up time of the thrust profile of the spacecraft or rocket is lengthened or, in the alternative, is delayed to a point sufficient to reduce velocity pointing error by softening the ignition transient.

In further methods, any possible combination of the above disclosed methods may be used simultaneously or in stages to soften the ignition transient. For example, modification of the grain geometry and pre-pressurization of the combustion chamber may both be employed to achieve the desired objective.

When using the methods of the present invention disclosed above, the following advantages may be obtained over the existing technology used in spin-stabilized spacecraft or rockets:

1. Spin-stabilized spacecraft or rockets may be launched with less fuel load, thus significantly decreasing cost of launch and operation.
2. As lower spin rates may be used to obtain velocity precision pointing using the present method, required tolerances of the spacecraft or rocket need not be as high, thus decreasing the manufacturing cost.
3. Significant improvements in velocity precision pointing of spin-stabilized spacecraft or rockets may be obtained.

What is claimed is:

1. A method for velocity precision pointing in spin-stabilized spacecraft or rockets during thrusting maneuvers, said method comprising:

gradually increasing thrust over a time period $t_r$ to rise from a low value of from 0 to 50% of maximum thrust to a high value of greater than 50% of maximum thrust by softening the ignition transient, said time period of said rise in thrust $t_r$ being equal to or greater than at least one period of the spin rate of the spacecraft, and being calculated by the following formula (I):

$$t_r = n(2\pi/\Omega) \qquad (I)$$

wherein n, the number of revolutions of the spacecraft desired, is a number greater than or equal to 1 and less than or equal to $t_b\Omega/4\pi$, $t_b$ being the total burn time and $\Omega$, the spacecraft spin rate, is greater than 0 and less than or equal to 42 radians/second.

2. The method of claim 1, wherein said spin-stabilized spacecraft or rockets have a solid rocket motor using solid propellant, said softening of the ignition transient being achieved by modification of the solid propellant, said modification comprising modifying a grain geometry of the solid propellant to delay burn time so that $t_r = n(2\pi/\Omega)$.

3. The method of claim 1, wherein said spin-stabilized spacecraft or rockets have a solid rocket motor using solid propellant, the softening of the ignition transient being achieved by modification of the solid propellant, said modification comprising applying a coating of slow burning material upon the solid propellant.

4. The method of claim 1, wherein said spin-stabilized spacecraft or rockets have a solid rocket motor using solid propellant having an exposed surface area, the softening of the ignition transient being achieved by varying a grain density, a density of fuel and oxidizer in a binder, of said solid propellant over an exposed surface area or as a function of propellant depth, where depth is defined in the direction of the burn surface area regression.

5. The method of claim 1, wherein said spin-stabilized spacecraft or rockets have a combustion chamber, said combustion chamber being pre-pressurized with a gas having a molecular mass smaller than that of combustion products and which is unreactive with the propellant.

6. The method of claim 1, wherein said spin-stabilized spacecraft or rockets have a combustion chamber, with one or more relief valves installed in said combustion chamber to soften the ignition transient by regulating pressure in said combustion chamber.

7. The method of claim 1, wherein said spin-stabilized spacecraft or rockets have a nozzle throat having a ring formed thereon from an ablative material which ablates during combustion to soften the ignition transient.

8. The method of claim 1, wherein said spin-stabilized spacecraft or rockets have a combustion chamber with a nozzle, said having a rubber fitting at a throat section of said nozzle to regulate the pressure of the combustion chamber.

9. The method of claim 1, wherein said spin-stabilized spacecraft has a combustion chamber with a throat, an exit nozzle, and an exit area, said method further comprising:

filling the exit nozzle with an ablative material; and
forming a hole in said exit nozzle with a diameter equal to or greater than a diameter of the throat,
so that as the ablative material ablates during combustion, the exit area and thrust increase.

10. The method of claim 1, wherein softening of the ignition transient is achieved by pulsing the engine to produce a rise in thrust from a low value of from 0 to 50% of maximum thrust to a high value of greater than 50% of maximum thrust over said time period $t_r$.

11. The method of claim 1, wherein said spin-stabilized spacecraft or rockets comprises a combustion chamber, said combustion chamber having a pyrogen igniter therein which softens the ignition transient.

12. The method of claim 2, further comprising applying a coating of slow burning material upon the solid propellant.

13. The method of claim 2, further comprising varying a grain density, the density of fuel and oxidizer in a binder, of said solid propellant over an exposed surface area or as a function of propellant depth, where depth is defined in the direction of the burn surface area regression.

14. The method of claim 3, further comprising varying a grain density, the density of fuel and oxidizer in a binder, of said solid propellant over an exposed surface area or as a function of propellant depth, where depth is defined in the direction of the burn surface area regression.

15. The method of claim 2, further comprising prepressurizing a combustion chamber of said spin-stabilized spacecraft with a gas having a molecular mass smaller than that of the combustion products and which is unreactive with the propellant.

16. The method of claim 3, further comprising prepressurizing a combustion chamber of said spin-stabilized spacecraft with a gas having a molecular mass smaller than that of the combustion products and which is unreactive with the propellant.

17. The method of claim 4, further comprising prepressurizing a combustion chamber of said spin-stabilized spacecraft with a gas having a molecular mass smaller than that of the combustion products and which is unreactive with the propellant.

18. The method of claim 5, further comprising prepressurizing a combustion chamber of said spin-stabilized spacecraft or rocket with a gas having a molecular mass smaller than that of the combustion products and which is unreactive with a propellant used in the spacecraft or rocket.

\* \* \* \* \*